(12) United States Patent
Inazawa et al.

(10) Patent No.: US 8,006,601 B2
(45) Date of Patent: Aug. 30, 2011

(54) FIBER REINFORCED RESIN MEMBER AND METHOD OF MANUFACTURING THE SAME, AND APPARATUS MANUFACTURING FIBER FABRIC

(75) Inventors: Koichi Inazawa, Nishikamo-gun (JP); Natsuhiko Katahira, Toyota (JP); Fujio Hori, Kariya (JP)

(73) Assignees: Toyota Jidosha Kabushiki Kaisha, Aichi (JP); Kabushiki Kaisha Toyota Jidoshokki, Aichi (JP)

( * ) Notice: Subject to any disclaimer, the term of this patent is extended or adjusted under 35 U.S.C. 154(b) by 19 days.

(21) Appl. No.: 12/598,369

(22) PCT Filed: Aug. 8, 2008

(86) PCT No.: PCT/JP2008/064288
§ 371 (c)(1),
(2), (4) Date: Oct. 30, 2009

(87) PCT Pub. No.: WO2009/022641
PCT Pub. Date: Feb. 19, 2009

(65) Prior Publication Data
US 2010/0083815 A1    Apr. 8, 2010

(30) Foreign Application Priority Data
Aug. 10, 2007    (JP) ................... 2007-209901

(51) Int. Cl.
*D04C 1/00* (2006.01)
*D04C 3/00* (2006.01)

(52) U.S. Cl. .............. 87/1; 87/7; 87/23; 87/30; 87/34

(58) Field of Classification Search ............. 87/1, 5, 87/6, 7, 9, 11, 23, 29, 30, 34
See application file for complete search history.

(56) References Cited

U.S. PATENT DOCUMENTS

| 2,918,777 | A | * | 12/1959 | Reeve et al. ............. 57/15 |
| 3,007,497 | A | * | 11/1961 | Shobert ................. 138/125 |
| 3,397,847 | A |   | 8/1968  | Thaden |
| 4,304,169 | A | * | 12/1981 | Cimprich et al. ............ 87/29 |

(Continued)

FOREIGN PATENT DOCUMENTS
DE    2937377 A1    4/1981
(Continued)

*Primary Examiner* — Shaun R Hurley
(74) *Attorney, Agent, or Firm* — Sughrue Mion, PLLC

(57) ABSTRACT

An object of the present invention is to provide a high-quality fiber reinforced resin member that enables a longitudinal yarn to be laid out, without slipping, around an outer periphery of a mandrel having at least a bent portion, thus allowing both the longitudinal yarn and a diagonal yarn to be evenly laid out, and a method of manufacturing the fiber reinforced resin member, as well as an apparatus manufacturing a fiber fabric for the fiber reinforced resin member. A fiber reinforced resin member 1 includes an elongate fiber fabric formed by braiding a plurality of longitudinal yarns Q, . . . extending in a longitudinal direction of the fiber fabric and a plurality of diagonal yarns P, . . . inclined at a predetermined angle to the longitudinal direction, the fiber fabric being impregnated with resin that is then hardened. The fiber reinforced resin member 1 has at least a bent portion 1". The longitudinal yarns Q, . . . are spirally wound at the bent portion 1", in a posture in which the longitudinal yarns are inclined at an angle of, for example, 10 to 15 degrees to the longitudinal direction.

6 Claims, 5 Drawing Sheets

U.S. PATENT DOCUMENTS

| | | | | |
|---|---|---|---|---|
| 5,006,291 | A | * 4/1991 | Fish | 264/103 |
| 5,203,249 | A | * 4/1993 | Adams et al. | 87/34 |
| 5,398,586 | A | * 3/1995 | Akiyama et al. | 87/6 |
| 5,468,327 | A | * 11/1995 | Pawlowicz et al. | 156/393 |
| 5,580,627 | A | * 12/1996 | Goodwin et al. | 428/36.3 |
| 5,979,288 | A | * 11/1999 | Gallagher et al. | 87/36 |
| 7,252,028 | B2 | * 8/2007 | Bechtold et al. | 87/34 |
| 2010/0052203 | A1 | * 3/2010 | Inazawa et al. | 264/103 |
| 2010/0252182 | A1 | 10/2010 | Rettig | |

FOREIGN PATENT DOCUMENTS

| | | |
|---|---|---|
| DE | 3843488 A1 | 7/1990 |
| DE | 4004473 A1 | 8/1991 |
| DE | 4122785 A1 | 1/1993 |
| DE | 102007054645 A1 | 5/2009 |
| EP | 0523471 A1 | 1/1993 |
| JP | 61-068232 A | 4/1986 |
| JP | 01-168432 A | 7/1989 |
| JP | 05-068728 A | 3/1993 |
| JP | 06-146133 A | 5/1994 |
| JP | 09-132844 A | 5/1997 |
| JP | 11-350317 A | 12/1999 |
| JP | 3215308 B2 | 10/2001 |
| WO | 2006/076384 A2 | 7/2006 |

* cited by examiner

FIBER REINFORCED RESIN MEMBER AND METHOD OF MANUFACTURING THE SAME, AND APPARATUS MANUFACTURING FIBER FABRIC

TECHNICAL FIELD

The present invention relates to a fiber reinforced resin member used particularly as roof side rails of a vehicle, and a method of manufacturing the fiber reinforced resin member, and an apparatus manufacturing a fiber fabric for the fiber reinforced resin member.

BACKGROUND ART

A-pillars (also called roof side rails; pillars positioned obliquely forward of a driver and at laterally opposite ends of the vehicle to support a front window) need to offer both a static strength characteristic (for example, flexural rigidity) and a crash resistance characteristic exhibited at the time of a collision of the vehicle. For recent hybrid vehicles, electric vehicles, and the like for which efforts have been made to improve the safety of the vehicle and to reduce the weight thereof, a fiber reinforced resin member, which has an appropriate rigidity and a light weight, is suitable as the A-pillars.

An example of the fiber reinforced resin member is a carbon fiber reinforced plastic member (CFRP). The fiber reinforced resin member is formed by using fiber yarns with a predetermined tensile strength and the like as a longitudinal yarn extending in a longitudinal direction of the member and a diagonal yarn with a predetermined inclination to the longitudinal direction, to braid both the longitudinal yarn and the diagonal yarn to form a multiple winding layer structure, then impregnating the multiple winding layer structure with resin, and hardening the resin. In the fiber reinforced resin member, the longitudinal yarn contributes to the flexural rigidity. The winding layer structure including the winding layers with the different orientations contributes to the crash resistance characteristic.

The above-described roof side rails are shaped along the front side of the vehicle so as to extend to a roof thereof, that is, shaped such that a straight portion and a bent portion are continuous with each other. The longitudinal yarn and the diagonal yarn are wound along this shape.

Patent Document 1 describes a method for manufacturing a fiber fabric forming the above-described fiber reinforced resin member. Specifically, a manufacturing apparatus is used which has two braiders in each of which an axial (longitudinal) yarn supply section and a braider yarn supply section are installed. Both an axial (longitudinal) yarn and a braider yarn are wound around the outer periphery of a linear mandrel by carrying out a control method of reciprocating the linear mandrel through the braiders and stopping driving of one of the braiders while the other braider is being driven.

Patent Document 1: JP Patent No. 3215308

DISCLOSURE OF THE INVENTION

The apparatus disclosed in Patent Document 1 can wind both the longitudinal yarn and the braider yarn around the outer periphery of the linear mandrel. However, if the longitudinal yarn is supplied to the outer periphery of the mandrel including a bent portion as is the case with the roof side rails, then at the bent portion, the longitudinal yarn may slip on the mandrel and fail to be evenly laid out around the outer periphery of the mandrel. If the longitudinal yarn slips at the bent portion, braiding density may vary depending on an area of the mandrel; the longitudinal yarn may concentrate in some areas and may be absent in other areas. Thus, naturally, the bent portion offers a low strength.

The present invention has been made in view of these problems. An object of the present invention is to provide a high-quality fiber reinforced resin member that enables the longitudinal yarn to be laid out, without slipping, around the outer periphery of the mandrel having at least the bent portion, thus allowing the longitudinal yarn and the diagonal yarn to be evenly laid out, and a method of manufacturing the fiber reinforced resin member, as well as an apparatus manufacturing a fiber fabric for the fiber reinforced resin member.

To accomplish the object, the fiber reinforced resin member according to the present invention including an elongate fiber fabric formed by braiding a plurality of longitudinal yarns extending in a longitudinal direction of the fiber fabric and a plurality of diagonal yarns inclined at a predetermined angle to the longitudinal direction, the fiber fabric being impregnated with resin that is then hardened, the fiber reinforced resin member being characterized in that the fiber reinforced resin member has at least a bent portion, and the longitudinal yarns are spirally wound at the bent portion, in a posture in which the longitudinal yarns are inclined at the predetermined angle to the longitudinal direction.

The fiber reinforced resin member is formed by, for example, alternately forming, around an outer periphery of the mandrel, serving as a core material for the fiber reinforced resin member, a winding layer made up of the longitudinal yarns extending in the longitudinal direction of the mandrel and a winding layer made up of the diagonal yarns (braider yarns) inclined at the predetermined angle to the longitudinal direction to form a plurality of sets each of a combination of the two types of winding layers, filling a thermosetting resin between the winding layers, and hardening the resin.

The mandrel used is made of any material such as steel or rein. Depending on the shape of the fiber reinforced resin member, the mandrel finally remains in the fiber reinforced resin member as a member component without being pulled out. If the fiber reinforced resin member is applied as the already described A-pillar, since the A-pillar is not a simple elongate cylindrical member but has a complicated shape, for example, an eclipse having one end with a circular cross section, a recessed center, and the other end gradually approaching a bolt fastening plate, the mandrel, serving as a core material, remains as a member component. In this case, to minimize the weight of the fiber reinforced resin member as a whole, the mandrel is preferably molded using an ABS resin (a copolymerized synthetic resin of acrylonitrile, butadiene, and styrene), which has a light weight and a high strength.

The fiber reinforced resin member according to the present invention is characterized by having at least a bent portion in which the wound longitudinal yarns are evenly laid out, and to achieve the even layout, the longitudinal yarns are spirally wound at the bent portion so as to incline at the predetermined angle to the longitudinal direction of the fiber reinforced resin member.

Heuristics and experiments of the present inventor and the like indicate that an attempt to lay out the longitudinal yarns so that the longitudinal yarns extend in the longitudinal direction in the bent portion of the fiber reinforced resin member results in slippage of the longitudinal yarns on the outer periphery of the mandrel. This in turn indicates that manufacturing a fiber reinforced resin member with an even layout of the longitudinal yarns (the longitudinal yarns with a uniform density) is extremely difficult.

Thus, in the fiber reinforced resin member according to the present invention, the longitudinal yarns are spirally wound at the bent portion at the predetermined angle to the longitudinal direction of the fiber reinforced resin member. The preferable range of the angle is specified to be 10 to 15 degrees.

The experiments of the present inventor and the like indicate that when the angle of the longitudinal yarns at the bent portion is smaller than 10 degrees, the longitudinal yarns slip on the mandrel and that when the angle exceeds 15 degrees, the flexural rigidity of the fiber reinforced resin member decreases significantly. The above-described angle range is thus specified with both the processibility and strength of the fiber reinforced resin member taken into account. Of course, the longitudinal yarns in the straight portion of the fiber reinforced resin member are laid out in a posture in which the longitudinal yarns are oriented in the longitudinal direction of the fiber reinforced resin member. Furthermore, the angle of the diagonal yarns to the longitudinal direction of the fiber reinforced resin member is set to about 45 degrees.

In connection with the strength characteristic of the fiber reinforced resin member, the flexural rigidity (flexural strength) thereof depends significantly on a hardened resin layer made up of the winding layer of the longitudinal yarns. The crash resistance (impact resistance) performance of the fiber reinforced resin member depends significantly on a braiding structure of the diagonal yarns and the longitudinal yarns.

The fiber reinforced resin member is formed by forming a plurality of (for example, four) sets each of the combination of the winding layer of the longitudinal yarns and the winding layer of the diagonal yarns on the outer periphery of the mandrel, then impregnating the fiber winding layers with the thermosetting resin, and hardening the thermosetting resin.

According to the fiber reinforced resin member according to the present invention, even if the fiber reinforced resin member has the bent portion, a possible disadvantageous situation is prevented in which the longitudinal yarns may slip on the outer periphery of the mandrel to form an uneven winding layer of the longitudinal yarns. Furthermore, in winding the longitudinal yarns at the bent portion, the rotation speed of a braider having a longitudinal yarn supply section and the movement speed of the mandrel have only to be adjusted so that the longitudinal yarns are spirally wound around the outer periphery of the bent portion of the mandrel at an angle of about 10 to 15 degrees. This prevents the processing efficiency of the fiber reinforced resin member from being reduced by processing of the bent portion.

Furthermore, the present invention provides a method of manufacturing a fiber reinforced resin member, the method being characterized by comprising a first step of supplying a mandrel having at least a bent portion, with a longitudinal yarn extending in a longitudinal direction of the mandrel and a diagonal yarn inclined at a predetermined angle to the longitudinal direction, to braid a plurality of the longitudinal yarns and a plurality of the diagonal yarns to manufacture an elongate fiber fabric, and a second step of impregnating the fiber fabric with resin and hardening the resin to manufacture the fiber reinforced resin member, and in that in the first step, the longitudinal yarns are spirally wound at a bent portion of the mandrel in a posture in which the longitudinal yarns are inclined at a predetermined angle to the longitudinal direction.

The manufacturing method according to the present invention forms, by braiding, a plurality of layers made up of the longitudinal yarns and a plurality of layers made up of the diagonal yarns, around the outer periphery of the mandrel having the bent portion as described above, then impregnates the layers with the thermosetting resin and hardens the thermosetting resin. To be evenly laid out at the bent portion, the longitudinal yarns are spirally wound at the bent portion at the predetermined angle to the longitudinal direction of the fiber reinforced resin member.

The angle of the spiral winding is adjusted within the range of 10 to 15 degrees to the longitudinal direction of the fiber reinforced resin member as already described.

A predetermined number of combinations of a winding layer of the longitudinal yarns and a winding layer of the diagonal yarns are formed around the outer periphery of the mandrel to form an intermediate member. The intermediate member is transferred to a mold with a predetermined cavity space. A thermosetting resin is filled into the mold and then hardened.

As a resin impregnation and hardening method, a well-known RTM method may be applied which places the intermediate member with the winding layers formed around the outer periphery of the mandrel, in the mold, then places the cavity in a vacuum atmosphere, then fills the resin into the cavity, and pressurizes and molds the intermediate member. A measure may be taken which, before vacuum suction of the interior of the cavity, places a balloon or a large number of beads inside the mandrel to exert an internal pressure on the mandrel. Instead of filling the resin into the cavity, another method pre-winds a film of a thermosetting resin around the outer periphery of the mandrel so that a thermal treatment allows the film to be melted to impregnate the fiber fabric with the melted thermosetting resin.

Moreover, an apparatus manufacturing a fiber fabric according to the present invention manufactures an elongate fiber fabric by braiding a plurality of longitudinal yarns extending in a longitudinal direction of the fiber fabric and a plurality of diagonal yarns inclined at a predetermined angle to the longitudinal direction, and comprises a first braider and a second braider installed at a distance from each other, a first bobbin installed in the first braider to supply the diagonal yarns and a second bobbin installed in the second braider to supply the longitudinal yarns, moving means for moving the mandrel having at least a bent portion, inside the first and second braiders in a direction from the second braider toward the first braider, and control means that rotates both the first and second braiders at the bent portion of the mandrel.

Unlike in the case of the configuration of a conventional braider machine, the manufacturing apparatus according to the present invention is roughly composed of a braider (second braider) having a bobbin from which the longitudinal yarns are fed and a braider (first braider) which is positioned in front of the second braider and having a bobbin from which the diagonal yarns are fed.

For example, a winding layer of the longitudinal yarns and a winding layer of the diagonal yarns are formed as follows. Ends of the longitudinal and diagonal yarns are wound around (or taped to) an end of the mandrel. The mandrel is moved with the first braider rotated and the second braider not rotated. Thus, the winding layer of the longitudinal yarns is formed and the winding layer of the diagonal yarns is simultaneously formed on the winding layer of the longitudinal yarns. The longitudinal yarns are laid out and fixed on the mandrel by the winding layer of the diagonal yarns.

To form the winding layers at the bent portion of the mandrel, the mandrel is moved with the second braider slowly rotated. At this time, the rotation speed of the second braider is determined by the moving speed of the mandrel and the peripheral length of the bent portion so that the longitudinal yarns are spirally wound at an inclination of 10 to 15 degrees.

When the formation of the winding layer in the section of the bent portion of the mandrel is finished and the process enters the straight portion again, the rotation of the second braider is stopped, with the mandrel continuing to be moved. Then, the longitudinal yarns are laid out at the straight portion in the longitudinal direction, and the winding layer of the diagonal yarns formed by the fist braider is simultaneously formed on the longitudinal yarns.

Here, in connection with the formation of the winding layer of the diagonal yarns, the rotation of the first and second braiders is based on a large number of gears built in the braiders in associated postures in a ring direction and a bobbin moving groove which is formed in the ring direction so as to bypass rotating shafts of the gears; the rotation of the first and second braiders refers to rotation of the gears moving the bobbin through the moving groove to supply the diagonal yarns, thus winding the diagonal yarns around the outer periphery of the mandrel passing through the braider.

Furthermore, the manufacturing apparatus includes moving means for fixedly positioning the mandrel and moving the mandrel as described above, and control means for controllably rotationally driving one or both of the braiders at a rotation speed corresponding to the moving speed of the mandrel every time the longitudinal yarn or the diagonal yarn is formed on the mandrel.

The above-described manufacturing apparatus according to the present invention allows predetermined numbers of winding layers of the longitudinal yarns and winding layers of the diagonal yarns to be simultaneously formed around the outer periphery of the mandrel. In particular, the use of the manufacturing apparatus configured as described above allows the winding layer of the longitudinal yarns to be efficiently formed without causing the longitudinal yarns to slip at the bent portion of the mandrel.

The intermediate member manufactured by the manufacturing apparatus is transferred to the mold as already described. The process then shifts to the resin impregnation and hardening step.

As appreciated from the above description, with the method of manufacturing the fiber reinforced resin member and the apparatus manufacturing the fiber fabric according to the present invention, the longitudinal yarns can be laid out, without slipping, around the outer periphery of the mandrel having the bent portion, and the winding layer of the longitudinal yarns having an even density can be efficiently formed. Furthermore, with the fiber reinforced resin member according to the present invention, even if the fiber reinforced resin member has a bent portion, the longitudinal yarns are evenly laid out at the bent portion. The longitudinal yarns are thus wound at a uniform density, providing a fiber reinforced resin member generally exhibiting an excellent flexural rigidity characteristic.

NUMERALS IN THE DRAWINGS

1 . . . Fiber reinforced resin member, 1a . . . Mandrel, 1b, 1d . . . Winding layers of longitudinal yarns, 1c, 1e . . . Winding layer of diagonal layers, 1', 1'a . . . Straight portions, 1" . . . Bent portion, 1''' . . . Fastening plate portion, 10 . . . First braider, 11 . . . Gear rotating shaft, 12 . . . Bobbin moving groove, 13 . . . First bobbin, 14 . . . Guide ring, 15 . . . Wheel, 20 . . . Second braider, 21 . . . Second bobbin, 22 . . . Wheel, 30 . . . Moving rail, 40 . . . Positioning member, 100 . . . Manufacturing apparatus (braider machine), P . . . Diagonal yarn, Q . . . Longitudinal yarn

BEST MODE FOR CARRYING OUT THE INVENTION

Figure 1:
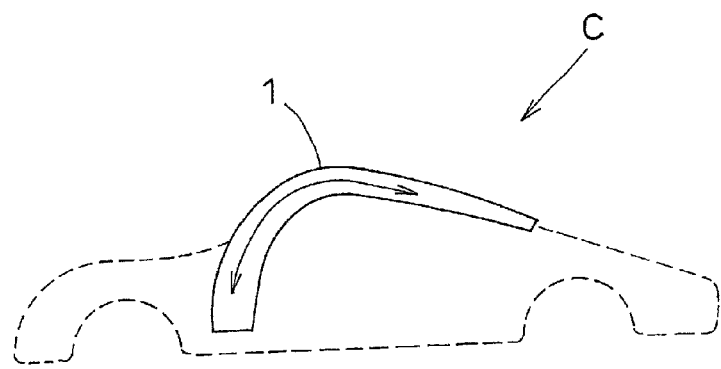
FIG. 1 is a diagram illustrating a position where an A-pillar to which a fiber reinforced resin member according to the present invention is applied is mounted in a vehicle.
Figure 2:
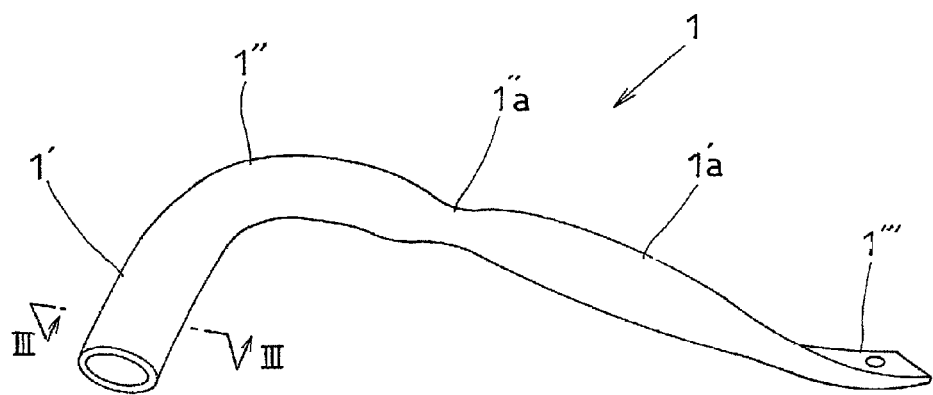
FIG. 2 is a perspective view of an embodiment of the manufactured fiber reinforced resin member.
Figure 3:
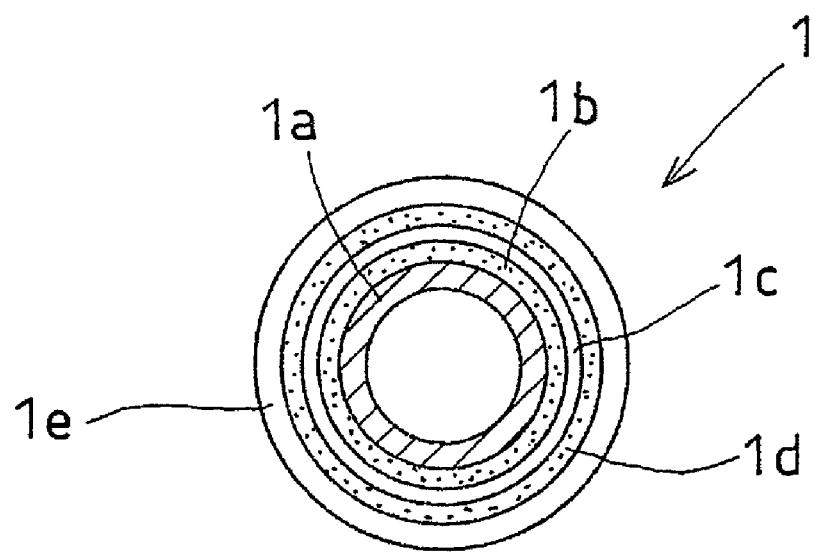
FIG. 3 is a sectional view of the fiber reinforced resin member taken along line III-III in FIG. 2.
Figure 4:
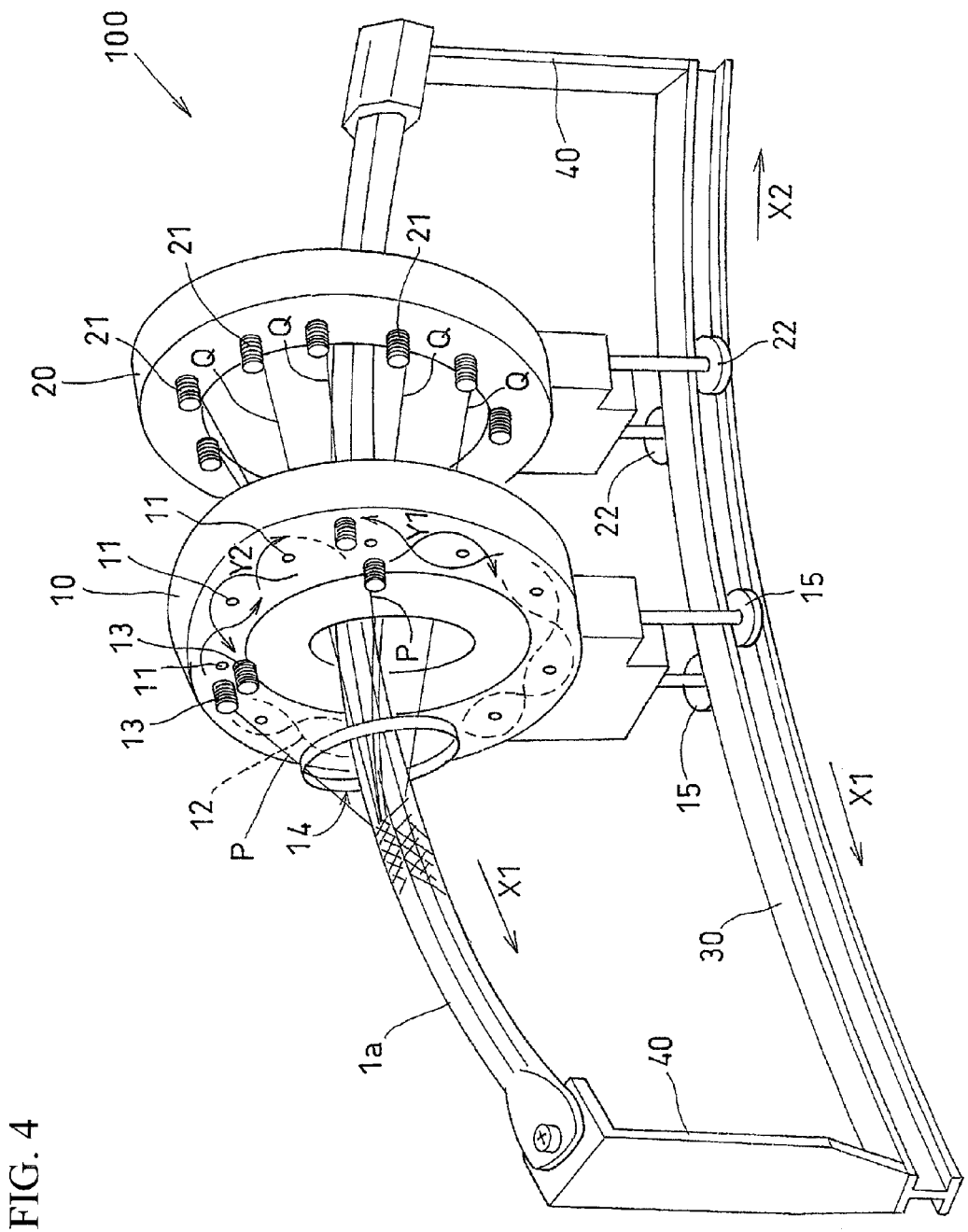
FIG. 4 is a perspective view of an embodiment of a manufacturing apparatus according to the present invention.
Figure 5:
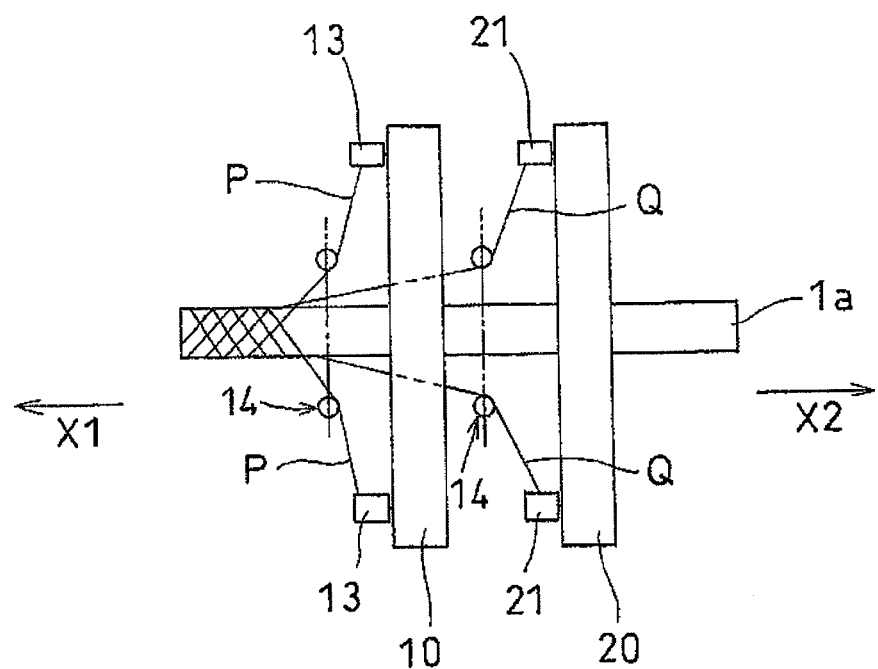
FIG. 5 is a side view of the manufacturing apparatus according to the present invention.
Figure 6:
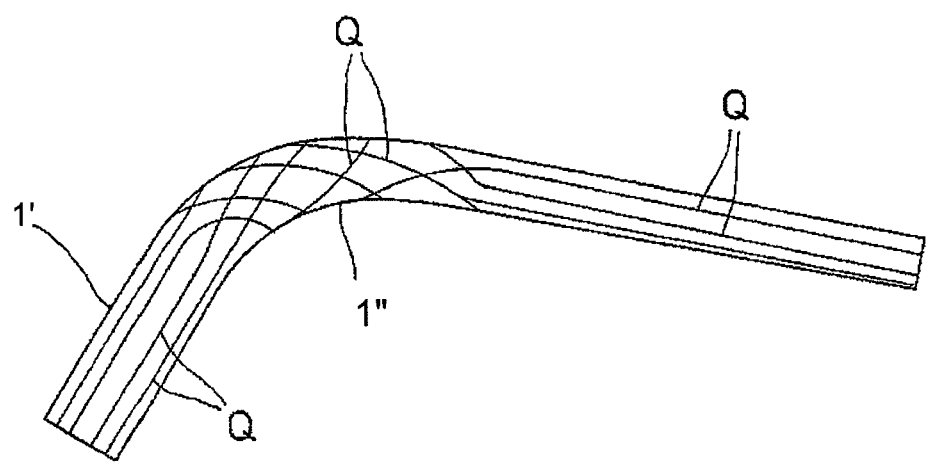
FIG. 6 is a diagram illustrating a winding aspect of longitudinal yarns formed all along the length of the mandrel.
Figure 7:
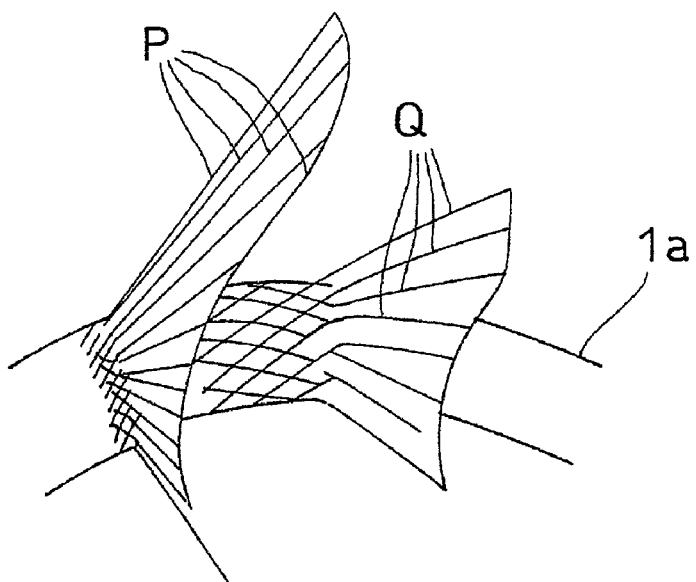
FIG. 7 is a diagram illustrating a winding aspect of longitudinal yarns and diagonal yarns at a bent portion of the mandrel.
Figure 8:
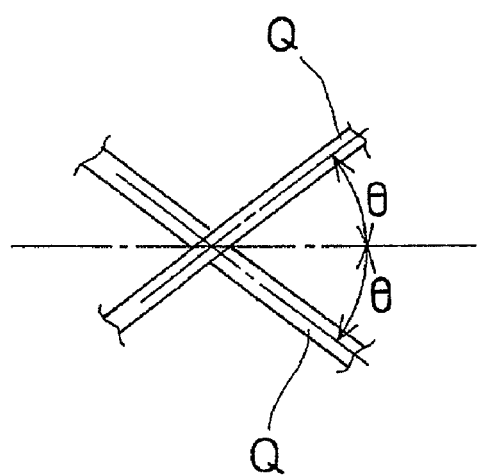
FIG. 8 is a diagram illustrating the inclination of the longitudinal yarns to a longitudinal direction of the fiber reinforced resin member.

Embodiments of the present invention will be described below with reference to the drawings. FIG. 1 is a diagram illustrating a position where an A-pillar to which a fiber reinforced resin member according to the present invention is applied is mounted in a vehicle. FIG. 2 is a perspective view of an embodiment of the manufactured fiber reinforced resin member. FIG. 3 is a sectional view of the fiber reinforced resin member taken along line III-III in FIG. 2. FIG. 4 is a perspective view of an embodiment of a manufacturing apparatus according to the present invention. FIG. 5 is a side view of the manufacturing apparatus according to the present invention. FIG. 6 is a diagram illustrating a winding aspect of longitudinal yarns formed all along the length of the mandrel. FIG. 7 is a diagram illustrating a winding aspect of longitudinal yarns and diagonal yarns at a bent portion of the mandrel. FIG. 8 is a diagram illustrating the inclination of the longitudinal yarns to a longitudinal direction of the fiber reinforced resin member. The shape of the mandrel and the number of winding layers forming the fiber reinforced resin member are not limited to those shown in the embodiments.

The fiber reinforced resin member according to the present invention is suitable for A-pillars of a vehicle, which needs to exhibit an appropriate flexural strength and appropriate impact resistance performance. The A-pillars are support members for a front window which are positioned in front of and on the right and left side of a passenger in a vehicle C shown in FIG. 1. Applying the fiber reinforced resin member 1 to the A-pillars allows the above-described strength characteristics to be sufficiently offered. The fiber reinforced resin member also has a light weight. Thus, the fiber reinforced resin member is particularly suitable for recent hybrid vehicles and the like.

FIG. 2 shows an embodiment of the fiber reinforced resin member 1 applied to the A-pillars. The fiber reinforced resin member 1 is not a simple, linear cylindrical member. Since the fiber reinforced resin member 1 is applied to the A-pillars, the fiber reinforced resin member 1 is shaped to have not only straight portions 1' and 1'a but also a bent portion 1". The fiber reinforced resin member 1 further has a plate portion 1''' that allows the fiber reinforced resin member 1 to be fastened to another member making up the vehicle. Furthermore, the sectional shapes of relevant portions are not uniform. The straight portion 1' has a circular cross section, and the straight portion 1'a has an elliptic cross section. The bent portion 1" has an elliptic cross section with a partly inwardly recessed portion 1"a. The fastening plate portion 1''' has a flat cross section as well as a bolt hole.

FIG. 3 is a sectional view of the fiber reinforced resin member 1 illustrating the configuration thereof. The fiber reinforced resin member 1 is composed of a mandrel 1a which is a core material made of an ABS resin, a winding layer 1b wound around the outer periphery of the mandrel 1a and made up of longitudinal yarns, a winding layer 1c wound around the outer periphery of the winding layer 1b and made up of diagonal yarns, a winding layer 1d made up of longitudinal yarns located around the outer periphery of the winding layer 1c, and a winding layer 1e made up of diagonal yarns located around the outer periphery of the winding layer 1d. The winding layers are impregnated with a thermosetting resin, which is then hardened to form the fiber reinforced resin member 1. The numbers of the winding layers made up of the longitudinal yarns and the winding layers made up of the diagonal yarns are not limited to those shown in the figures but may be at least three.

Description will be given below of a manufacturing apparatus (braider machine) 100 which, in manufacturing the fiber reinforced resin member 1, manufactures an intermediate member (a member in which the winding layers formed around the outer periphery of the mandrel), which has not been impregnated with the resin yet, as well as an operation aspect of the manufacturing apparatus 100.

FIG. 4 is a perspective view generally illustrating the manufacturing apparatus 100. FIG. 5 is a side view illustrating the manufacturing apparatus.

The manufacturing apparatus 100 has two braiders, a first braider 10 and a second braider 20 both of which are annular and have a central opening through which the mandrel 1a can reciprocate.

The braiders 10 and 20 are arranged at a predetermined distance from each other. Wheels 15, 15 and 22, 22 are attached to legs of the braiders 10 and 20, respectively. An elongate moving rail 30 is installed between the wheels 15, 15 and between the wheels 22, 22. Positioning members 40, 40 extend vertically from opposite ends of the moving rail 30. The mandrel 1a is fixedly positioned at upper ends of the positioning members 40, 40.

In the illustrated posture, the braiders 10 and 20 are arranged so as to be able to be moved, by a servo motor or a cylinder mechanism (not shown in the drawings), within planes (which are substantially orthogonal to arrows X1 and X2) defined by the annular portions thereof, in a posture in which the predetermined distance is maintained between the braiders 10 and 20. The servo motor or cylinder mechanism moves the braiders 10 and 20 so as to prevent the mandrel 1a from interfering with the annular portions, that is, so that the mandrel 1a can pass through the substantial center of the central opening of each of the annular portions. Here, the wheels 15, 15 and wheels 22, 22 may be configured so that the distance between the pair of wheels 15, 15 (22, 22) and the braider 10 (20) can follow the rail 30 even though the braider 10 (20) is moved by the servo motor or cylinder mechanism. Furthermore, the moving rail 30, on which the mandrel 1a is fixedly positioned, can be moved in the directions of arrows X1 and X2 by rotational driving of at least one of the pair of wheels 15, 15 and the pair of wheels 22, 22 or by moving means (not shown in the drawings). If the mandrel 1a is shaped so as to not to interfere with the annular portions, the servo motor or cylinder mechanism may be omitted.

A large number of gears are contained in the first braider 10 and arranged in a circumferential direction thereof. Gear rotating shafts 11, . . . of the gears are shown in the figure. Moreover, a bobbin moving groove 12 is formed in the first braider 10 so as to meander in a shape of the number eight in order to bypass the gear rotating shafts. Bobbins 13, . . . for diagonal yarns move along the moving groove 12 to supply diagonal yarns P, . . . to the outer periphery of the mandrel.

Furthermore, a guide ring 14 is located, by support means (not shown in the drawings), on a side of each of the first braiders 10, 20 which corresponds to the direction of arrow X1 (the guide ring 14 located on a side of the braider 20 which corresponds to the direction of arrow X1 is shown only in FIG. 5). The diagonal yarns P, . . . extending from the first bobbins 13, . . . and longitudinal yarns Q, . . . extending from second bobbins 21, . . . are guided to the guide ring 14 and thus supplied to the outer periphery of the mandrel.

Various instruction signals from a computer (not shown in the drawings) are transmitted to the illustrated manufacturing apparatus 100 by wired or wireless communication. The computer contains a control section that controls the moving speed of the bobbins 13, . . . in the braider 10, the rotation speed of the braider 20, and the moving speed of the mandrel 1a, which relates to the moving speed of the bobbins 13, . . . in the braider 10 and the rotation speed of the braider 20.

First, to simultaneously form winding layers made up of the diagonal yarns P, . . . , and the longitudinal yarns Q, . . . around the outer periphery of the mandrel 1a, the mandrel 1a is moved to a right end in FIGS. 4 and 5, and from this position, moved leftward (the direction X1). Before the movement of the mandrel 1a, ends of the diagonal yarns P and longitudinal yarns Q are taped to the outer periphery of the mandrel.

To form the winding layers at the straight portion of the mandrel 1a, only the braider 10 is rotated, with the braider 20 not rotated, and the mandrel 1a is moved. That is, around the outer periphery of the mandrel 1a, the longitudinal yarns Q, . . . are laid out in the longitudinal direction of the mandrel 1a, and the diagonal yarns P, . . . are laid out on the longitudinal yarns Q, . . . .

Once the mandrel 1a reaches a predetermined position in front of the braider 10, the braider 20 starts to be rotated slowly. In the meantime, the braider 10 is continuously rotating.

The rotation speed (or rotation number) of the braider 20 is adjusted according to the moving speed of the mandrel 1a. The rotation speed of the braider 20 is set at least to such a value as allows the longitudinal yarns Q to be spirally wound around the outer periphery of the mandrel 1a at an angle of 10 to 15 degrees to the longitudinal direction. The above-described control section adjusts the rotation speed of the braider 20 and the moving speed of the mandrel 1a.

The winding of the longitudinal yarns progresses. Once the mandrel 1a reaches the straight portion 1'a, the rotation of the braider 20 is stopped. Then, the longitudinal yarns Q, . . . are laid out in the longitudinal direction of the mandrel 1a. The diagonal yarns P, . . . are laid out on the longitudinal yarns Q, . . . .

The above-described series of control allows the longitudinal yarns Q, . . . to be evenly wound around the outer periphery of the mandrel 1a and then allows the diagonal yarns P, . . . to be evenly wound on the longitudinal yarns Q, . . . . FIG. 6 schematically shows the winding aspect of the longitudinal yarns formed around the outer periphery of the mandrel. In the straight portion, the longitudinal yarns are laid out along the longitudinal direction. In the bent portion, the spirally wound longitudinal yarns are laid out.

Here, the rotation of the braider refers to movement of the bobbin 13, . . . in the first braider 10 along the bobbin moving groove 12, . . . as shown in the braider 10 in FIG. 4. Each of the bobbins 13, . . . moves meanderingly and timely so that a clockwise (a direction Y1 in FIG. 4) set of bobbins and a counterclockwise (a direction Y2 in FIG. 4) set of bobbins avoid interfering with each other. The plurality of bobbins 13, . . . move at a predetermined moving speed in synchronism with the movement of the mandrel 1*a* to wind the diagonal yarns P, . . . at an angle of 45 degrees to the longitudinal direction of the mandrel 1*a*. The braider 20 has the same structure but rotates at the bent portion of the mandrel 1*a*.

FIG. 7 shows a winding form of the longitudinal yarns Q in the bent portion of the mandrel and a winding form of the diagonal yarns P formed around the outer periphery of the longitudinal yarns Q. The diagonal yarns P are wound around the outer periphery of the spirally wound longitudinal yarns Q or a plurality of such combinations are provided, to form a winding aspect in which the longitudinal yarns and the diagonal yarns are braided.

The above-described intermediate member is transferred to a mold with a cavity space in a predetermined form. In the mold, the intermediate member is impregnated with the thermosetting resin, which is then hardened. As a resin impregnation and hardening method, a well-known RTM method may be applied which places, in the mold, the intermediate member with the winding layers formed around the outer periphery of the mandrel, then places the cavity in a vacuum atmosphere, then fills the resin into the cavity placed in a vacuum atmosphere, and pressurizes and molds the intermediate member.

[Discussions of the Angle of the Longitudinal Yarns to the Longitudinal Direction of the Fiber Reinforced Resin Member and the Elasticity Modulus of the Fiber Reinforced Resin Member as a Bending Member]

The present inventor and the like examined a relationship between the angle ($\theta$) of the longitudinal yarns to the longitudinal direction of the fiber reinforced resin member and the elasticity modulus of the fiber reinforced resin member as a bending member. The results of the examination are shown in Table 1, shown below. The angle ($\theta$) of the longitudinal yarns to the longitudinal direction of the fiber reinforced resin member is shown in FIG. 8.

TABLE 1

| $\theta$ (°) | 0 | 10 | 15 | 20 | 30 | 45 |
|---|---|---|---|---|---|---|
| E (GPa) | 150 | 120 | 100 | 70 | 28 | 22 |

Table 1 clearly indicates that the flexural rigidity of the fiber reinforced resin member is maximized when the longitudinal yarns are at an angle of 0 degree and the elasticity modulus decreases sharply when the angle is larger than 15 degrees.

On the other hand, processibility was checked with the angle varied at which the longitudinal yarns were spirally wound at the bent portion of the mandrel. The results of the check indicate that an angle $\theta$ of smaller than 10 degrees causes the longitudinal yarns to slip on the outer periphery of the mandrel, sharply reducing processibility.

Thus, in connection with the flexural rigidity and processibility of the fiber reinforced resin member, the conclusion can be drawn that the angle at which the longitudinal yarns are spirally wound at the bent portion of the mandrel is preferably set within the range of 10 to 15 degrees to the longitudinal direction of the fiber reinforced resin member.

The embodiments of the present invention have been described in detail with the drawings. However, the specific configuration is not limited to these embodiments. Any change in design which does not depart from the spirit of the present invention is included in the present invention.

The invention claimed is:

1. A fiber reinforced resin member including an elongate fiber fabric formed by braiding a plurality of longitudinal yarns extending in a longitudinal direction of the fiber fabric and a plurality of diagonal yarns inclined at a predetermined angle to the longitudinal direction, the fiber fabric being impregnated with resin that is then hardened, the fiber reinforced resin member being characterized:

in that the fiber reinforced resin member has at least a bent portion, and the longitudinal yarns are spirally wound at the bent portion, in a posture in which the longitudinal yarns are inclined at the predetermined angle to the longitudinal direction.

2. The fiber reinforced resin member according to claim 1, wherein inclination of the longitudinal yarns to the longitudinal direction is within a range of 10 to 15 degrees.

3. A method of manufacturing a fiber reinforced resin member, the method being characterized by comprising a first step of supplying a mandrel having at least a bent portion, with a longitudinal yarn extending in a longitudinal direction of the mandrel and a diagonal yarn inclined at a predetermined angle to the longitudinal direction, to braid a plurality of the longitudinal yarns and a plurality of the diagonal yarns to manufacture an elongate fiber fabric, and a second step of impregnating the fiber fabric with resin and hardening the resin to manufacture the fiber reinforced resin member, and in that in the first step, the longitudinal yarns are spirally wound at a bent portion of the mandrel in a posture in which the longitudinal yarns are inclined at a predetermined angle to the longitudinal direction.

4. The method of manufacturing the fiber reinforced resin member according to claim 3, wherein inclination of the longitudinal yarns to the longitudinal direction is within a range of 10 to 15 degrees.

5. An apparatus manufacturing a fiber fabric, the apparatus manufacturing an elongate fiber fabric by braiding a plurality of longitudinal yarns extending in a longitudinal direction of the fiber fabric and a plurality of diagonal yarns inclined at a predetermined angle to the longitudinal direction, the apparatus comprising:

a first braider and a second braider installed at a distance from each other;

a first bobbin installed in the first braider to supply the diagonal yarns, and a second bobbin installed in the second braider to supply the longitudinal yarns;

moving means, which includes a positioning member and an elongated moving rail, wherein the mandrel having at least a bent portion fixed at upper ends of the positioning member extending vertically from opposite ends of the moving rail so that the moving rail can be moved by a servo motor or a cylinder mechanism to cause the mandrel to pass through the substantial center of the central opening of each annular portion of the first and second braiders in a direction from the second braider toward the first braider and so as to prevent the mandrel from interfering with both the first and second braiders; and control means that rotates both the first and second braiders at the bent portion of the mandrel.

6. An apparatus manufacturing a fiber fabric, the apparatus manufacturing an elongate fiber fabric by braiding a plurality of longitudinal yarns extending in a longitudinal direction of the fiber fabric and a plurality of diagonal yarns inclined at a predetermined angle to the longitudinal direction, the apparatus comprising:
- a first braider and a second braider installed at a distance from each other;
- a first bobbin installed in the first braider to supply the diagonal yarns, and a second bobbin installed in the second braider to supply the longitudinal yarns;
- moving means, which includes a positioning member and an elongated moving rail, wherein the mandrel having at least a bent portion fixed at upper ends of the positioning member extending vertically from opposite ends of the moving rail so that the moving rail can be moved by a servo motor or a cylinder mechanism to cause the mandrel to pass through the substantial center of the central opening of each annular portion of the first and second braiders in a direction from the second braider toward the first braider and so as to prevent the mandrel from interfering with both the first and second braiders; and
- control means which rotates only the first braider at a straight portion of the mandrel and which rotates both the first and second braiders at the bent portion of the mandrel.

* * * * *